United States Patent
Facemire

[11] 3,858,690
[45] Jan. 7, 1975

[54] CHOCK

[76] Inventor: Odie D. Facemire, Clark Rd., Shirley, Mass. 01464

[22] Filed: Aug. 10, 1973

[21] Appl. No.: 387,536

[52] U.S. Cl. .............................................. 188/32
[51] Int. Cl. ............................................ B60t 3/00
[58] Field of Search ............ 188/4 R, 32; 248/119 R

[56] References Cited
UNITED STATES PATENTS

| 1,746,415 | 2/1930 | Burkart | 188/32 |
| 2,723,005 | 11/1955 | Wink | 188/32 |
| 3,734,241 | 5/1973 | Hale | 188/32 |

FOREIGN PATENTS OR APPLICATIONS

| 1,424,527 | 1/1967 | France | 188/32 |

Primary Examiner—Duane A. Reger
Attorney, Agent, or Firm—Norman S. Blodgett; Gerry A. Blodgett

[57] ABSTRACT

A chock having three elements which are hinged together for use in various configurations. The elements are a plate, and two wedges hingedly mounted to one another about a common axis. Punctures in selected surfaces increase friction with the ground. The chock is usable with either the plate and a wedge in contact or both wedges in contact.

9 Claims, 4 Drawing Figures

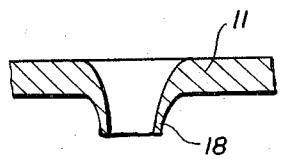
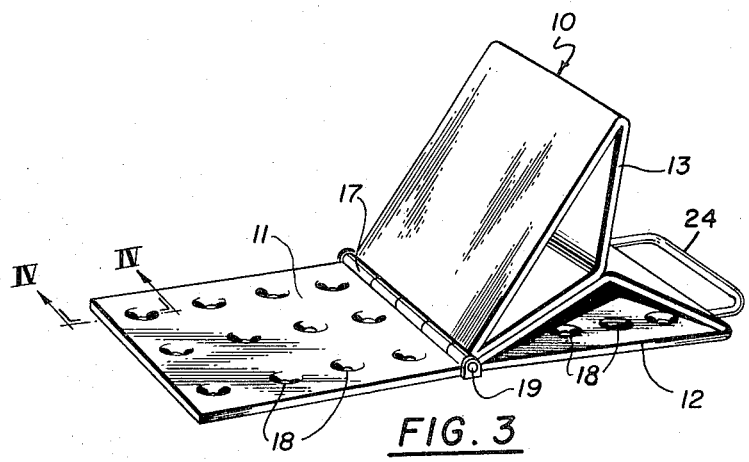
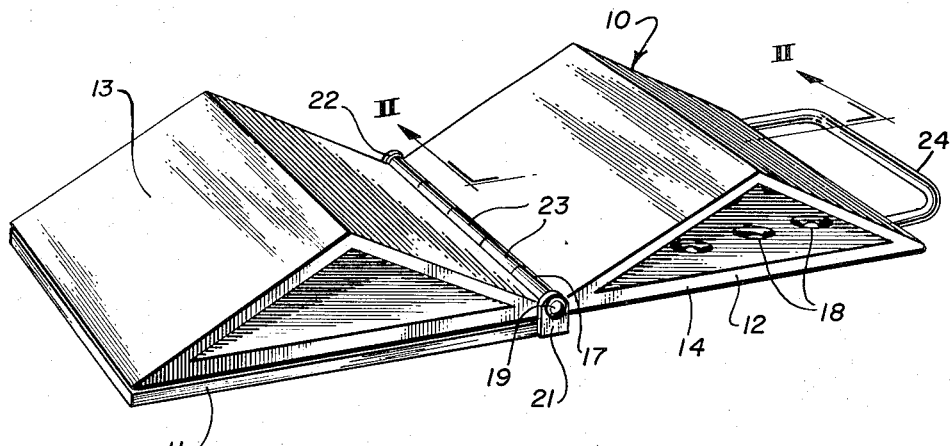
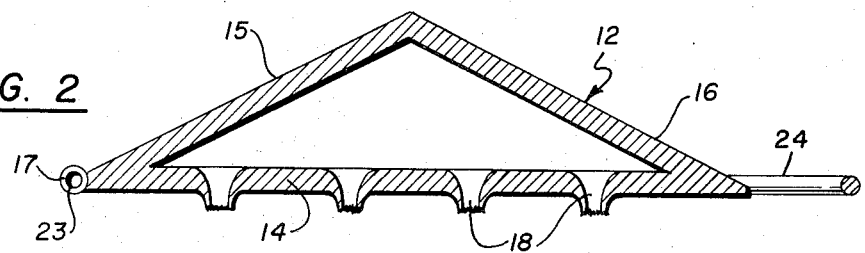

CHOCK

BACKGROUND OF THE INVENTION

In the operation of motor vehicles and, particularly, trucks there are occasions when it is necessary to use auxiliary means, such as a chock, to prevent the vehicle from rolling from a parked position. This is particularly desirable in the case of a truck parked on a hill, where because of the weight of the truck plus its load, the danger of the truck running away when only held by conventional braking system is quite great. Many types of devices have been used in the past to prevent the vehicle from rolling, including large stones and blocks of wood which are found at the site. When chocks are carried as part of the vehicle equipment, they have usually been blocks of wood in the form of a wedge, which some suffer from a number of disabilities. A wooden wedge, for instance, deteriorates rather rapidly under pressure, is difficult to store, and in winter weather becomes covered with ice and is useless. Furthermore, it cannot grip on an icy surface. A wedge having a certain angle designed for use on a hill is practically useless when a vehicle is at the crown of a hill where it is liable to roll in either direction. This situation is practically prevalent in the operation of house trailers where people moving around in the trailer are likely to set it in motion in either direction. When a truck trailer is being unloaded, similar unloading activity can cause it to move toward or away from the unloading dock and cause the docking plate to drop. These and other difficulties experienced with the prior art devices have been obviated in a novel manner by the present invention.

It is, therefore, an outstanding object of the invention to provide a chock which is light in weight and, yet, is capable of serving to lock heavy-duty vehicles in place.

Another object of this invention is the provision of a chock which is capable of being formed into a plurality of configurations for use under various circumstances.

A further object of the present invention is the provision of a chock which may be folded into a compact unit for storage in a small space.

It is another object of the instant invention to provide a chock which can be easily constructed from readily obtainable materials, which is simple and inexpensive, and which is capable of a long life of useful service with a minimum of care.

A still further object of the invention is the provision of a chock for use with heavy vehicles when the vehicle is parked on a hill and under other conditions for use when the car is parked on the crown of the hill.

With these and other objects in view, as will be apparent to those skilled in the art, the invention resides in the combination of parts set forth in the specification and covered by the claims appended hereto.

SUMMARY OF THE INVENTION

A chock for a wheeled vehicle having a flat plate adapted to rest flat on the ground and to receive a substantial portion of the wheel pressure; and a wedge hingedly connected to the plate and adapted to rest on the ground to prevent the wheel from rolling.

More specifically, a second wedge is hingedly connected to the flat plate and to the first-mentioned wedge for hinged movement about the same axis that they share. Both wedges have the cross-sectional shape of an isosceles triangle with base angles of about 30°.

BRIEF DESCRIPTION OF THE DRAWINGS

The character of the invention, however, may be best understood by reference to one of its structural forms, as illustrated by the accompanying drawings, in which:

FIG. 1 is a perspective view of a chock embodying the principles of the present invention, FIG. 2 is a sectional view through a portion of the chock taken on the line II—II of FIG. 1, FIG. 3 is a perspective view of the invention showing it in a different condition, and FIG. 4 is a sectional view of the invention taken on the line IV—IV of FIG. 3.

DESCRIPTION OF THE PREFERRED EMBODIMENT

Referring first to FIG. 1 which best shows the general features of the invention, the chock, indicated generally by the reference numeral 10, is shown as consisting of a flat plate 11 which is adapted to rest flat on the ground and to receive a substantial portion of the wheel pressure, and a first wedge 12 which is hingedly connected to the plate and adapted to rest on the ground to prevent the wheel from rolling. As is obvious in the drawing, the wedge is tent-shaped and, in addition, the chock is provided with a second wedge 13 which is hingedly connected to the flat plate and to the first-recited wedge for hinged movement about the same axis that they share.

Referring particularly to FIG. 2, the wedge 12 has a bottom wall 14 which rests on the ground and two side walls 15 and 16 joined to the bottom wall and to each other to give a cross-section in the shape of an isosceles triangle. The flat plate 14 is rectangular and one edge is hingedly connected to the wedge 12 at the intersection of the bottom wall 14 and the side wall 15 by means of a hinge 17. The flat plate 11 and the walls of the first wedge 12 are formed of steel and generally tubular gripping elements 18 are punched out of the flat plate 11 and of the bottom wall 14 of the wedge 12 in the direction of the ground (extending from the undersurface).

As is evident in the drawings, the two wedges 12 and 13 are exactly similar in size, shape, and material. More specifically, the wedges have the cross-sectional shape of isosceles triangle with base angles of about 30°. The hinge 17 is made up of various apertured elements on all three member, i.e., the plate 11, the first wedge 12, and the second wedge 13 with a pin 19 extending through them. The plate 11 is provided with ears 21 and 22 extending upwardly at each end of the hinge and apertured to receive the pin 19. The first wedge 12 and the second wedge 13 are provided with alternate aligned tubular elements similar to the tubular elements 23 on the wedge 12 (see FIG. 2).

As is evident in FIG. 4, each gripping element 18 is formed during the punching operation by the flow of metal in such a way that it tapers from a fairly substantial wall thickness adjacent the undersurface of the plate 11 to a relatively thin, sharp wall at its lower edge. This allows the gripping element to pierce material, such as ice, and yet to have sufficient sheer strength to resist sidewise movement of the plate 11 and the wall 14 without damage. A handle 24 is welded to the first wedge 12.

The operation of the apparatus will now be readily understood in view of the above description. The arrangement of the parts shown in FIG. 1 is used when the vehicle is in a location where it may roll either frontward or backward. Such a situation exists, for instance, at the crown of a hill. Even on a level location, for instance, when the truck is being loaded, it is subject to exterior forces which may cause it to roll. The arrangement shown in FIG. 1 is useful for that purpose. The wedge 12 lies against the ground with its gripping elements 18 extending into the ground or ice as the case may be.

While the wedge 13 rests on top of the plate 11, which, in turn, rests on the ground with its gripping elements 18 suitably locked in place, the truck is either backed onto the chock or moved forward on to it. In any case, the wheel passes over one of the wedges which, because of the 30° base angle, does not extend too high to permit this. The wheel rests between the two wedges and this suitably prevents the vehicle from either going forward or backward. The gripping elements serve to maintain stability between the entire rig and the ground.

In the arrangement shown in FIG. 3, the chock is placed in condition to hold the vehicle when it is on a steep hill. Furthermore, it is used where there is a great danger of rolling in one direction, but little or no danger of movement in the other direction. In that condition, as is evident in the drawings, the wedge 13 is rotated about the hinge 17 so that it lies against the first wedge 12. Because the two base angles which lie together are 30°, the accumulative effect is to hold the bottom wall of the chock 13 at an angle of 60° to the ground. This is an extremely large angle which absolutely prevents the vehicle from rolling over the large obstruction which it provides. At the same time, the wheel pressure operating as it does between the plate 11 and the bottom wall of the wedge 13, tends to drive the gripping elements deeply into the ground to resist any sliding movement that might otherwise occur.

The storage condition of the chock is not shown in any of the views, but it is similar to the condition shown in FIG. 3. The wedges 13 and 12 lie in junction position as shown in FIG. 3, but for storage the plate 11 is rotated about the hinge 17 into a location against the bottom wall of the wedge. In this condition the chock is very compact and easy to store in a small space. The hinging of the plate to a condition where it lies against the bottom walls of the chock 13 is made possible because of the offset nature of the hinging action provided by the ears 21 and 22. This causes the inner adjacent edge of the plate 11 to scribe a concentric circle around the outer surfaces of the tubular elements 23 formed on the wedges. The fact that the wedges 12 and 13 are tubular permits the chock to be easily carried and easily handled during use. The normal weak point in such a construction would be in the hinge, but it will be noted that the hinge only serves to hold the elements together, but receives little or no force during use. Particularly, no force would tend to bend it out of alignment. It is possible for use in snow and ice to form each gripping element 18, so that at its lower edge it blends into a knife edge, rather than the sharp but somewhat blunted edge that is shown in the drawings; this is a matter of selection that is available to the manufacturer.

It is obvious that minor changes may be made in the form and construction of the invention without departing from the material spirit thereof. It is not, however, desired to include all such as properly come within the scope claimed.

The invention having been thus described, what is claimed as new and desired to secure by Letters Patent is:

1. A chock for a wheeled vehicle, comprising:
   a. a flat plate adapted to rest flat on the ground and to receive a substantial portion of the wheel pressure,
   b. a wedge hingedly connected to the plate and adapted to rest on the ground and to prevent the wheel from rolling, and
   c. a second wedge hingedly connected to the flat plate and the first-recited wedge for hinged movement about the same axis that they share.

2. A chock as recited in claim 1, wherein the two wedges are exactly similar in size, shape and material.

3. A chock as recited in claim 1, wherein the wedges have the cross-sectional shape of isosceles triangles with base angles of about 30°.

4. A chock as recited in claim 1, wherein a handle extends from one of the wedges at a corner opposite the hinge.

5. A chock as recited in claim 1, wherein at least one of the wedges is tent-shaped.

6. A chock as recited in claim 1, wherein at least one of the wedges has a bottom wall which rests on the ground and two side walls joined to the bottom wall and to each other to give a cross-section in the shape of an isosceles triangle.

7. A chock as recited in claim 6, wherein the first plate is rectangular, and wherein one edge is hingedly connected to the wedges at the intersection of the bottom wall and a side wall.

8. A chock as recited in claim 1, wherein the flat plate and the walls of the wedges are formed of steel, and wherein generally-tubular gripping elements are punched out of the flat plate and at least some of the walls of the wedges.

9. A chock as recited in claim 1, wherein the total angle of the two wedge corners adjacent the axis is less than 90°.

* * * * *